(12) United States Patent
Vovan (10) Patent No.: US 10,648,499 B2
(45) Date of Patent: May 12, 2020

(54) CLIP NUT AND METHOD OF ASSEMBLING A CLIP NUT AND NUT COMBINATION

(71) Applicant: LISI Aerospace, Paris (FR)

(72) Inventor: Terry Vovan, Upland, CA (US)

(73) Assignee: LISI AEROSPACE, Paris (FR)

( * ) Notice: Subject to any disclaimer, the term of this patent is extended or adjusted under 35 U.S.C. 154(b) by 4 days.

(21) Appl. No.: 15/537,853

(22) PCT Filed: Dec. 22, 2014

(86) PCT No.: PCT/IB2014/003069
§ 371 (c)(1),
(2) Date: Jun. 19, 2017

(87) PCT Pub. No.: WO2016/102989
PCT Pub. Date: Jun. 30, 2016

(65) Prior Publication Data
US 2017/0350436 A1 Dec. 7, 2017

(51) Int. Cl.
*F16B 37/04* (2006.01)

(52) U.S. Cl.
CPC ............ *F16B 37/043* (2013.01); *F16B 37/04* (2013.01); *F16B 37/044* (2013.01)

(58) Field of Classification Search
CPC .... F16B 37/044; F16B 37/043; F16B 37/045; F16B 37/04; Y10S 411/97
USPC .......................................... 411/172, 174, 175
See application file for complete search history.

(56) References Cited

U.S. PATENT DOCUMENTS

| | | | | |
|---|---|---|---|---|
| 2,409,209 A * | 10/1946 | Johnson | ................ | F16B 37/044 411/111 |
| 3,009,499 A | 11/1961 | Weihe | | |
| 4,826,374 A * | 5/1989 | Baglin | ................ | F16B 37/044 411/103 |
| 4,875,816 A * | 10/1989 | Peterson | ............... | F16B 37/043 411/104 |
| 5,193,643 A * | 3/1993 | McIntyre | ............... | B60G 99/00 180/312 |
| 5,624,319 A * | 4/1997 | Golczyk | ............... | B21D 53/24 470/21 |
| 6,474,917 B2 * | 11/2002 | Gauron | ................ | F16B 37/044 411/112 |
| 6,854,941 B2 * | 2/2005 | Csik | ...................... | F16B 37/044 411/111 |

(Continued)

FOREIGN PATENT DOCUMENTS

WO     WO 0198033     12/2001

OTHER PUBLICATIONS

Rochus, Johan; International Search Report and Written Opinion of the International Searching Authority, Aug. 26, 2015, 11 pages, European Patent Office, Munich, Germany.

*Primary Examiner* — Roberta S Delisle (74) *Attorney, Agent, or Firm* — Henricks Slavin LLP (57) ABSTRACT

A clip nut 100 has first and second opposed arms 202, 204 extending longitudinally and the second arm 204 includes first and second walls 222, 224 extending transversely of the clip nut, and the first wall 222 includes a first plurality of cavities 234, 236 and the second wall 224 includes a second plurality of cavities 248, 250. A nut 102 includes legs 112, 114 extending into respective cavities. The nut is assembled with the clip nut by putting a leg into a cavity in the first wall and moving the nut toward the second arm to engage a cavity in the second wall.

17 Claims, 5 Drawing Sheets

(56) References Cited

U.S. PATENT DOCUMENTS

| | | | | |
|---|---|---|---|---|
| 6,918,725 B2* | 7/2005 | Gauron | ............... | F16B 37/043 |
| | | | | 411/112 |
| 7,648,319 B1 | 1/2010 | Ochoa | | |
| 7,698,798 B2* | 4/2010 | Toosky | ............... | B21K 25/00 |
| | | | | 29/432 |
| 8,177,466 B2* | 5/2012 | Csik | ............... | F16B 37/043 |
| | | | | 411/174 |
| 8,353,649 B2* | 1/2013 | Csik | ............... | F16B 37/045 |
| | | | | 411/108 |
| 9,267,529 B2* | 2/2016 | Tejero Salinero | ... | F16B 37/041 |
| 9,435,369 B2* | 9/2016 | Deck | ............... | F16B 39/24 |
| 2004/0202523 A1 | 10/2004 | Csik | | |
| 2008/0310931 A1 | 12/2008 | Csik | | |
| 2009/0103997 A1* | 4/2009 | Csik | ............... | F16B 37/045 |
| | | | | 411/112 |

\* cited by examiner

CLIP NUT AND METHOD OF ASSEMBLING A CLIP NUT AND NUT COMBINATION

CROSS REFERENCE TO RELATED APPLICATIONS

This application is a National Stage of International Application No. PCT/162014/003069, filed Dec. 22, 2014, the entire contents of which are incorporated herein by reference.

BACKGROUND

Field

This relates to fastener components, for example fastener components that can fit over a portion of a panel, including for example fasteners in the form of clip nuts.

Related Art

Clip nuts are typically configured to slide over an edge of a panel to align a nut with a hole formed in the panel. The nut receives a bolt, screw or other threaded element passed through the hole and threaded into the nut. Various such clip nuts may be used to mount items to the panel or for securing panels together. Clip nuts may be used in automobiles, appliances and aircraft, as well as in other applications. Also, a given application may call for a large number of clip nuts. For example, in assembling a single commercial aircraft hundreds of thousands of clip nuts can be used. Examples of clip nuts are described and illustrated in U.S. Pat. No. 8,177,466, all of which is incorporated herein by reference.

SUMMARY

In one example of a non-metal fastener component, for example a non-metal clip for a clip nut, the fastener component includes first and second arms spaced apart from each other and extending longitudinally from a junction where the first and second arms are connected. First and second walls extend outward from the first arm away from the second arm and non-parallel to a longitudinal axis of the clip. In one configuration, the first and second walls extend transversely of the first arm. The first and second walls include respective pluralities of cavities configured to receive tabs, legs or extensions on a nut configured to be placed between the first and second walls. In one configuration, the clip is configured to have posts on the first and second walls, wherein the post on a wall is positioned between spaced apart cavities on the wall. In one configuration, the posts are centrally located on the respective wall, and in another configuration, they are positioned substantially opposite each other across a cage or nest in which a nut is to be positioned. Each of the first and second walls may also include respective first and second upper walls spaced apart from each other. The first and second upper walls form upper walls for the respective cavities formed in their first and second walls. The first and second upper walls have respective portions that are spaced apart from each other a distance forming an opening sufficient to allow a nut having tabs to be inserted and removed through the opening. In one configuration, the first and second upper walls extend transversely of the clip. In another configuration, the first and second upper walls extend parallel to each other, and in a further configuration, they extend transversely at different heights from a surface of the first arm. In a still other configuration, one or both of the first and second upper walls include one or more sloping surfaces extending at an angle to a surface of the first arm.

In one example of a non-metal fastener component, for example a non-metal clip for a clip nut, the fastener component includes first and second arms spaced apart from each other and extending longitudinally from a junction wall. First and second walls extend outward from the first arm away from the second arm, and one or both of the first and second walls extend transversely of the first arm. Each of the first and second walls include respective cavities configured to receive tabs, legs or extensions on a nut configured to be placed between the first and second walls, and at least one cavity in each of the first and second walls includes an upper surface portion that limits the tabs, legs or extensions on the nut from moving upward away from the first arm. In one configuration, each of the cavities in each of the first and second walls have respective upper surfaces limiting the upward movement of the nut. In a further configuration, the upper surfaces of the cavities in the first wall are closer to the first arm than the upper surfaces of the cavities in the second wall. In another configuration, the upper surfaces of the cavities in the second wall are formed by a transversely extending third wall on the second wall. In one example, the third wall includes an upper surface that extends downwardly toward the first arm. In another example, the third wall extends at an angle of approximately 45° (plus or minus 10%) to an upper surface of the first arm. In another configuration, the second wall includes a post between spaced apart cavities in the second wall, and a third wall limiting upward movement of a nut away from the first arm extends beyond the post toward the first wall.

In any of the examples described herein of a non-metal fastener component, for example a non-metal clip for a clip nut, the fastener component can be configured to receive a nut releasably or removably positioned in a cage in the fastener component, for example between first and second walls having respective cavities therein. The nut includes a plurality of tabs extending in respective directions from the nut, for example as part of a base of the nut. In one example, the nut includes substantially parallel extending pairs of tabs, and in another example, the nut includes a first pair of tabs extending substantially parallel to each other, and a second pair of tabs extending in a direction substantially opposite the first pair of tabs. In one example, a tab in one pair is aligned with a tab in the other pair. Common nut configurations that can be accommodated in the fastener components described herein have two pairs of tabs extending opposite each other on opposite sides of an internally threaded barrel extending upwardly from a base structure including the tabs.

In a further example of a non-metal fastener component, for example a non-metal clip for a clip nut, the fastener component includes first and second spaced apart arms extending longitudinally from a connection wall. In one configuration, each of the first and second walls include respective posts positioned between spaced apart cavities on the respective wall. In one configuration, the posts are centrally located on the respective wall and first and second cavities are positioned symmetrically on opposite sides of the post. In one configuration, the cavities in the first wall are formed as a through-openings in the first wall, and in another configuration the cavities in the second wall are formed as cavities having defined depths. In a further configuration, a cavity in the first wall is positioned opposite a cavity in the second wall, and are substantially aligned with each other. In another configuration, each cavity in the first wall has sidewalls that diverge outwardly in a direction extending away from the second wall.

In another example of a non-metal fastener component, for example a non-metal clip for a clip nut, the fastener component includes first and second spaced apart arms extending longitudinally from respective end portions, and first and second walls extend outward from the first arm in a direction away from the second arm. The first and second walls have respective pairs of cavities, wherein each pair of cavities is separated by a respective post. Each post extends upwardly away from a base surface to a height at least equal to a height of the corresponding pair of cavities. Each wall has an upper wall extending across the cavities to form an upper wall for the cavities, and the post separates the cavities from each other. In one configuration, the post in the second wall is a central post having at least three sides extending upward away from a base surface or the surface of the first arm. In another configuration, the post in the second wall has at least four sides extending upward away from the base surface or the surface of the first arm. Multiple sides such as four or more, for example including a side at a distal corner area of the post, removes 90 degree corner formations that could be a focus of loading and possible material failure caused by a nut under torque. In a further configuration, the post in the second wall has a rounded surface. A rounded surface helps to distribute loading from a nut under torque through the material of the post. In a still further configuration, the second wall extending away from the first arm extends to an upper surface and a portion of the upper surface extends at an angle toward the first wall and a base surface or the upper surface of the first arm. In one example, the upper surface extends at an angle of approximately 45° relative to the base surface.

In a further example of a non-metal fastener component, for example a non-metal clip for a clip nut, the fastener component and a nut are combined together to form a fastener assembly. In one example, a clip having a first and second arms and first and second spaced apart walls extending upward from the first arm is configured to receive a nut having a plurality of tabs, legs or extensions. In one configuration, the first arm includes a first plurality of cavities and the second arm includes a second plurality of cavities, and a first portion of a nut having respective tabs is positioned between the first and second walls such that tabs on the nut extend into corresponding cavities in the first wall. The nut is moved toward the clip so that additional respective tabs contact a surface or surfaces on the second wall. The nut is pressed against the clip so that the additional respective tabs move past the contact surface or surfaces on the second wall and into respective cavities in the second wall. In one configuration, the clip and nut are configured so that the nut can float longitudinally, laterally, and axially or perpendicular to the first arm, as well as pivot. In another configuration, the cavities in the first and second walls are configured to limit the upward motion of the respective tabs on the nut.

These and other examples are set forth more fully below in conjunction with drawings, a brief description of which follows.

DETAILED DESCRIPTION

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

It should be understood that terminology used for orientation, such as front, rear, side, left and right, upper and lower, and the like, are used herein merely for ease of understanding and reference, and are not used as exclusive terms for the structures being described and illustrated. In the specification, the term "substantially" means "within about 10% more or less", each time this term is used.

In one example of a fastener assembly (FIGS. 1-10), a clip nut assembly 100 includes a nut 102, in the present example a metallic nut (FIGS. 1-3) and a clip 200, in the present example a non-metallic clip. The assembly can be placed on an edge of the panel, such as is described in U.S. Pat. No. 8,177,466, and a male fastener used to secure the panel through engagement with the clip nut.

The nut 102 (FIGS. 1-3) includes a base 104 supporting a generally cylindrical or tubular, internally threaded body or barrel 106. The base is substantially planar. The barrel extends from the base 104 to an end surface 108 defining a distal opening to the barrel. In the present example, the base 104 has a substantially smooth, flat bottom surface and a substantially smooth, flat upper surface 110, and the barrel 106 has an outer surface that curves in a transition to join the top surface 110 of the base. The base includes two pairs of tabs 112 and 114. The tabs in the first pair 112 extend outwardly relative to the barrel 106 in a direction substantially opposite the direction in which the tabs in the second pair 114 extend outwardly relative to the barrel. The directions in which the tabs extend are considered a longitudinal direction in the present examples, and the nut will be moved into a position by moving the nut in the direction in which a pair of tabs extends. Therefore, the respective tabs extend substantially parallel to the longitudinal direction. A longitudinal axis of the nut would extend through the center of the base and extend parallel to the tabs.

A first tab 116 in the first pair 112 is aligned or substantially aligned with a first tab 118 in the second pair of tabs 114. Similarly, a second tab 120 is substantially aligned with the second tab 122 in the second pair of tabs 114 (see FIG. 3). Other geometries and relative orientations are possible between the respective tabs. The base between aligned tabs includes respective radiused surfaces 124 (FIG. 3), and each tab in a pair is separated from the other tab in the pair by radiused surfaces 126, and in the present example a relatively straight base wall 128. The nut is substantially symmetrical about the longitudinal axis, except for the internal threads, and also symmetrical except for the thread about a transverse axis in the base perpendicular to the longitudinal axis.

The clip 200 (FIGS. 1-3 and 4-10) in the present example is a non-metal clip. The nonmetal material may be TORLON, and other poly-amide imides as well as other structural plastics or polymers, including among others; Vespel or Aurum (PI), Ultem (PEI), Victrex or Ketaspire (PEEK), Primospire (SRP), Polycarbonate, or Epoxide or Phenolic synthetic resins. The material can also be a composite material and may include fiber reinforcement or other strengthening materials, including such fiber reinforcement or other strengthening materials in the foregoing materials. The clip is preferably high strength but somewhat flexible to accommodate different panel thicknesses, and to permit relatively easy insertion of a nut into the clip while reliably retaining the nut in the clip once inserted.

Figure 1:
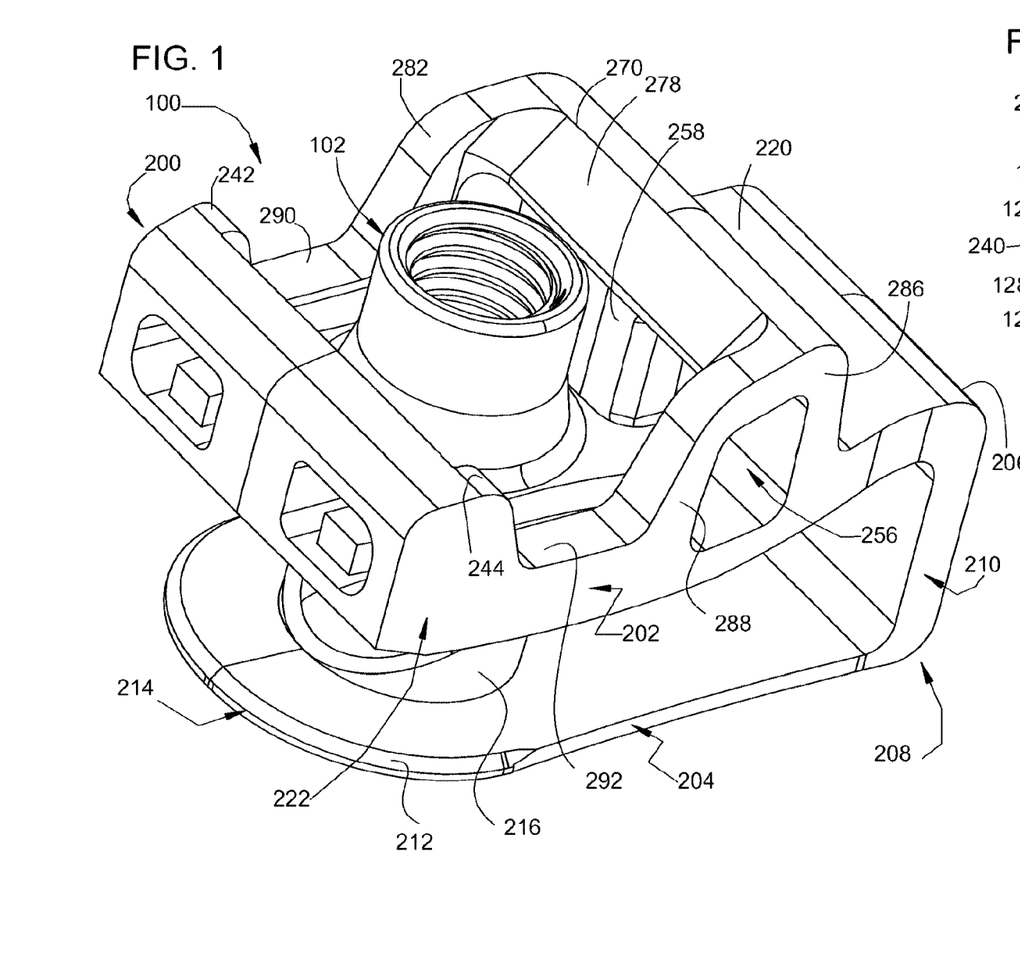
FIG. 1 is an upper right isometric view of a fastener component and nut combination in the form of a clip nut.
Figure 8:
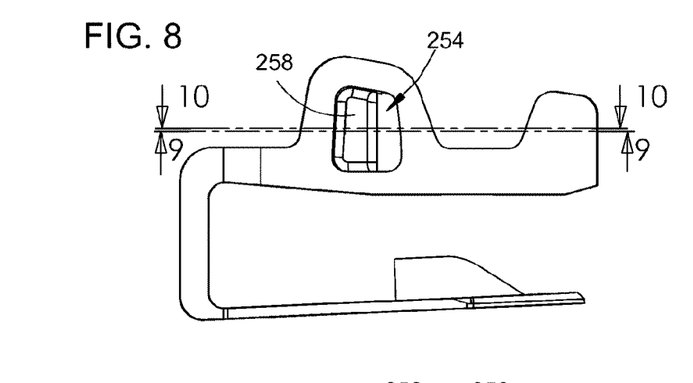
FIG. 8 is a left side elevation view of the clip of FIG. 4.
Figure 9:
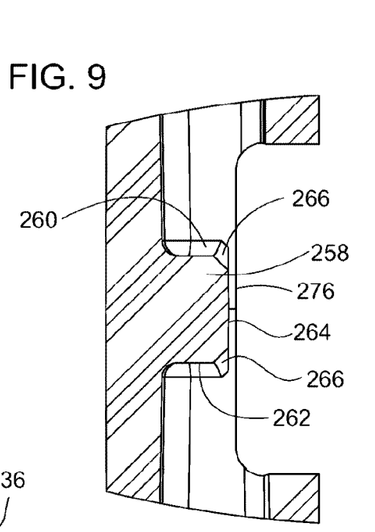
FIG. 9 is a planar section of the clip of FIG. 8 taken along line 9-9.

The clip 200 includes a first arm 202 and a second arm 204 spaced apart from each other to accommodate a panel between them, and extending longitudinally of the clip from respective proximal end portions 206 and 208 (FIG. 1). The proximal end portions are joined by an end wall 210, in the present example extending substantially straight between the first and second arms, and substantially straight transversely. As can be seen in FIGS. 1 and 8, the second arm 204 has a thickness less than the first arm 202 and the end wall 210. In the present examples, the first arm 202 and the end wall 210 are at least twice the thickness of the second arm 204, taken for example at a transverse cut through the first and second arms adjacent the end wall, and a horizontal cut through the end wall, for greater strength to withstand loading from torque when the assembly is used on a structure to secure a male fastener. The first and second arms are movable with respect to each other, for example through the flexibility of the second arm 204.

The second arm is substantially flat with a substantially constant thickness except for the transition between the second arm and the end wall 210, a distally-located chamfer 212 on an arcuate end portion 214 of the second arm and a ramped boss 216 surrounding a fastener opening 218. The ramped boss 216 engages an opening in a panel, and the fastener opening 218 accommodates a male fastener for engaging with the nut 102. In the present example, the opening 218 is substantially circular.

The first arm 202 of the clip 200 includes a relatively thick arm portion 220 (FIG. 1, relative to the thickness of the second arm 204) extending adjacent the end wall 210. The thickness of the arm portion 220 initially increases with distance from the end wall 210.

The first wall of the clip includes first and second walls 222 and 224, respectively, extending from the first arm. In the present example, the first and second walls 222 and 224 extend outwardly from a plane defined by a bottom surface 226 (FIG. 6) of the first arm 202. The first and second walls extend from the first arm 202 in a direction away from the second arm 204. In the present example, the first and second walls extend perpendicular or substantially perpendicular to the plane defined by the bottom surface 226. Both of the first and second walls 222 and 224 extend transversely or substantially transversely, in the present example, of the first arm. In the present example, the first and second walls are parallel or substantially parallel to each other. The first and second walls define opposite sides of a cage 228 (FIG. 4) and help to limit longitudinal movement of the nut 102 when the nut is in the cage. The longitudinal direction is aligned with a central axis of the first arm and extends between the first and second walls, and extends left and right as viewed in a plan view of FIG. 2.

The first wall 222 extends upwardly substantially perpendicular to a base or nut support surface 230, in other words substantially perpendicular to the bottom of the cage. The first wall includes a plurality of cavities extending longitudinally into an interior wall surface 232 (FIGS. 6 and 10) of the first wall. In the present example, the plurality of cavities includes a first opening 234 and a second opening 236 through the first wall from the cage to a distal surface 238 of the first wall. The first and second openings can receive a first pair of tabs 116 and 120 (FIG. 3) of the nut 102. The first and second openings can be configured to allow the first pair of tabs and therefore the adjacent portion of the nut to float laterally and to float longitudinally and vertically within the openings. The walls of the openings limit the float of the nut.

Figure 6:
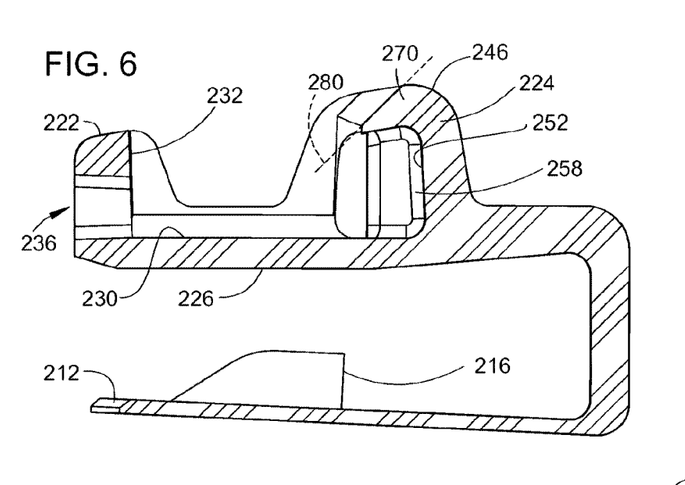
FIG. 6 is a partial sagittal section of the clip of FIG. 5 taken along line 6-6.
Figure 10:
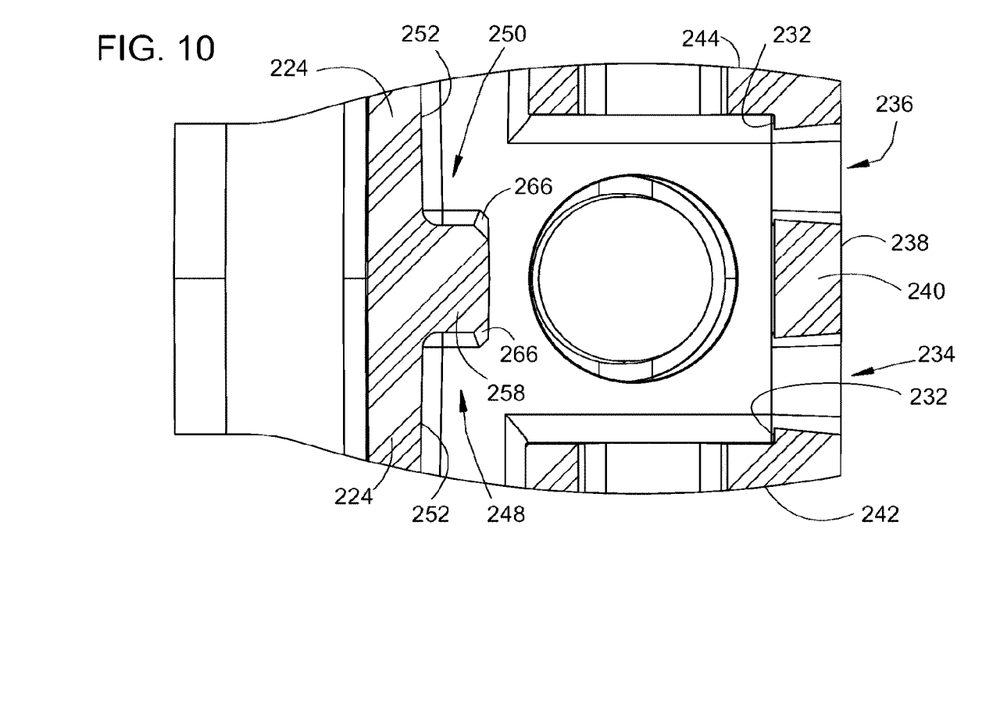
FIG. 10 is a planar section of the clip of FIG. 8 taken along line 10-10.

The first and second openings 234 and 236 in the present example each have upper and lower walls that diverge outwardly from the interior wall surface 232 to the distal wall surface 238 (FIGS. 6 and 10). Similarly, the first and second openings each have opposite side walls that diverge outwardly from the interior wall to the distal wall surface to help more evenly distribute loading that might occur from contact by a tab on a nut under torque. The sidewalls limit lateral float of a nut, and the upper and lower walls limit vertical float. The interior wall 232 of the cage limits longitudinal float of the nut in a distal direction.

The first and second openings 234 and 236 are spaced apart and separated from each other by a central post 240. In the present example, the central post is substantially bisected by a vertical plane through the longitudinal axis of the clip. The central post 240 also limits the longitudinal float of the nut in a distal direction.

The lateral sides of the first wall 222 include reinforcement walls 242 and 244 extending proximally and downwardly from lateral end portions of the first wall. The reinforcement walls begin approximately flush with the top of the first wall and extend at an angle proximally and downwardly at a relatively constant angle to the base surface 230 of the cage. Other geometries for the reinforcement walls can be used.

The second wall 224 extends upwardly substantially perpendicular to the base or nut support surface 230, in other words perpendicular or substantially perpendicular to the bottom of the cage. The second wall 224 terminates at a top surface 246 (FIG. 6), which also extends transversely of the clip. The second wall includes a plurality of cavities 248 and 250 extending longitudinally relative to the interior of the cage. The first and second cavities 248 and 250, respectively, are spaced apart from each other, and have portions generally aligned with respective first and second openings 234 and 236 in the first wall. The first and second cavities terminate at a back surface 252 of the second wall 224, helping to define the depths of the cavities 248 and 250. The first and second cavities receive respective tabs 118 and 122 of the nut 102, allowing that portion of the nut to float in the cage a limited amount.

Figure 2:
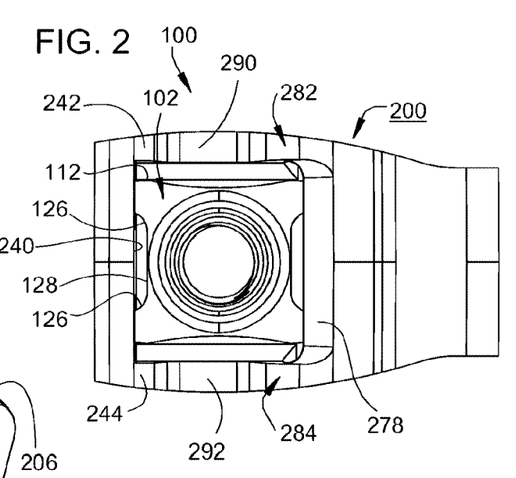
FIG. 2 is a top plan view of the assembly of FIG. 1.
Figure 3:
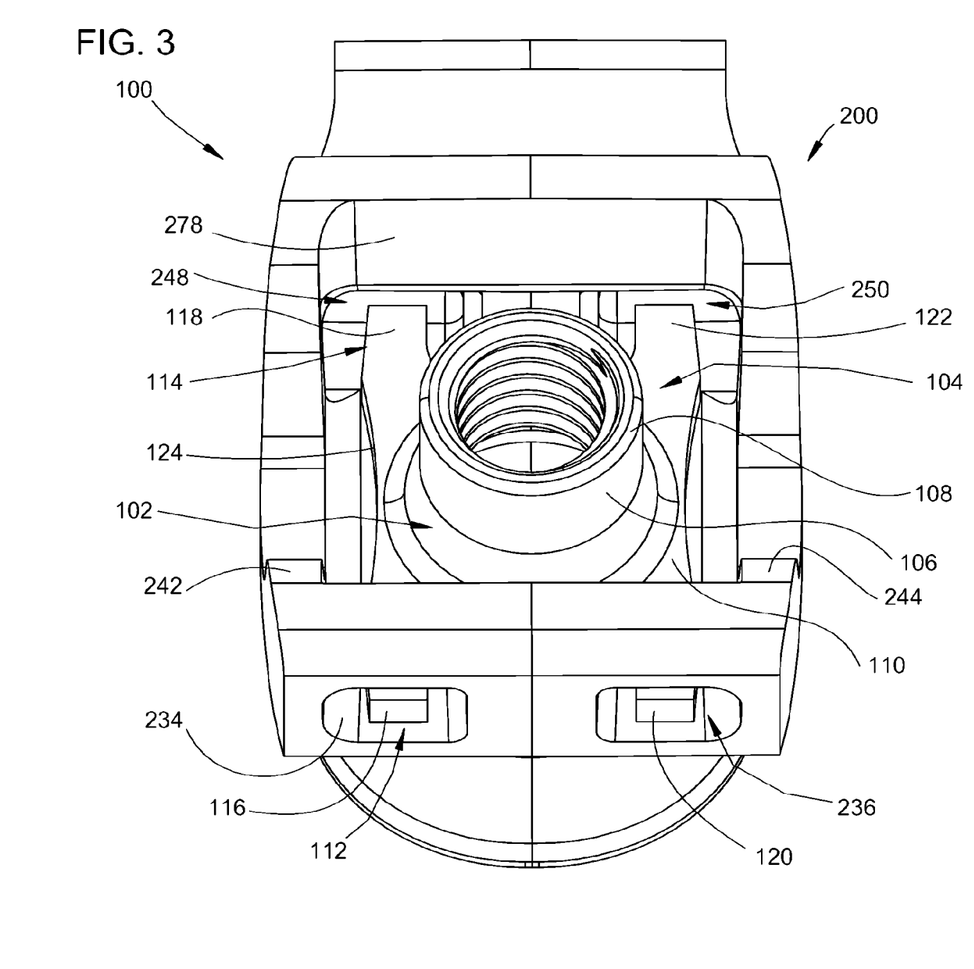
FIG. 3 is an upper front view of the assembly of FIG. 1.
Figure 4:
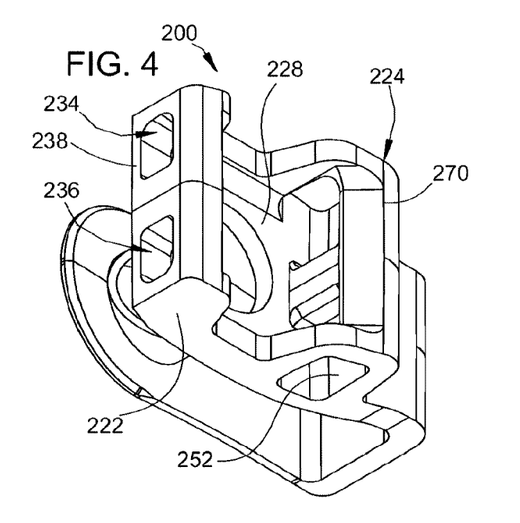
FIG. 4 is an upper right side and isometric view of the clip of the assembly of FIG. 1.
Figure 5:
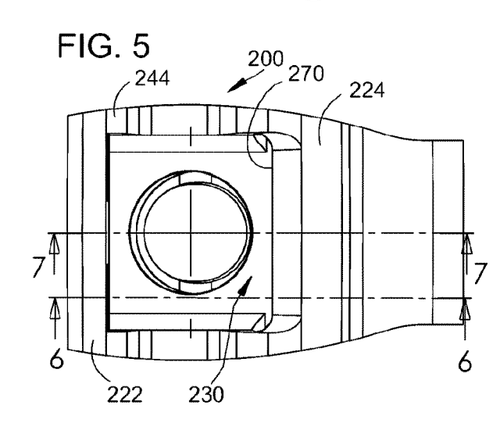
FIG. 5 is a top plan view of the clip of FIG. 4.

The first and second cavities 248 and 250 are spaced apart and separated from each other by a post 258 (FIGS. 1, 6). The post extends distally from the second wall 224 into the interior of the cage 228. The post 258 extends the height of the second wall 224, and has a width approximately the same as the central post 240, and in the present example slightly smaller. The post 258 has substantially straight sides 260 and 262 (FIG. 9), in the present example extending parallel to the longitudinal axis of the first arm, and has a substantially straight transverse front wall 264. If the post had only these three sides, the sides would intersect each other at corners or slight fillets. In the present example, the exterior corners of the post 258 are formed with angled walls 266, so that the post 258 is a 5-sided post, or other than square. Multiple sides such as four or more, reduces the number of or removes 90 degree corner formations that could be a focus of loading and possible material failure caused by a nut under torque. The sizes of the walls 266 in the horizontal direction are the same level of magnitude as the radiused surfaces 126 in the nut 102 (FIG. 2). The fourth and fifth surfaces 266 can also be radiused, preferably of the same order of magnitude as the radiused surfaces 126 in the nut so that pivoting movement of the nut is limited more by the sidewalls 260 and 262 of the post 258. The post can also have more than five surfaces, or the post can be rounded in cross-section to more uniformly distribute throughout the material possible loading from one or more parts of a nut under torque.

Figure 11:
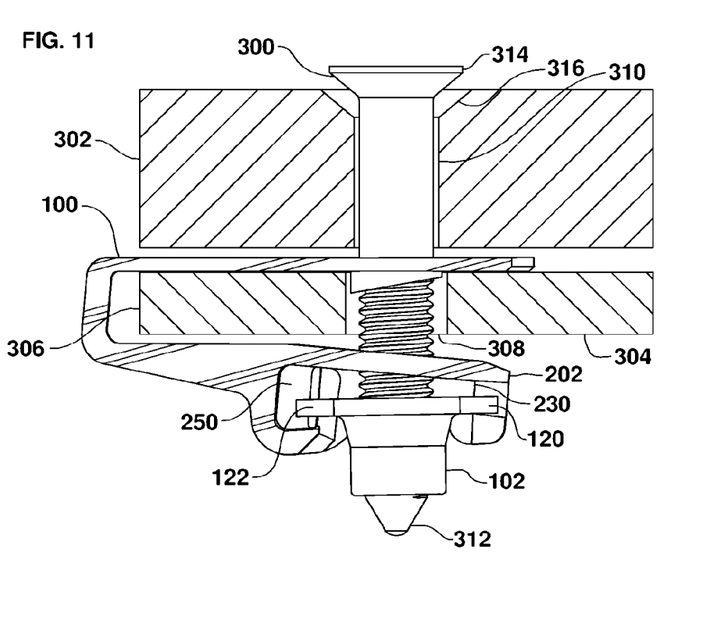
FIG. 11 is a side elevation and partial section view of an assembly of a clip nut and mating fastener for securing a pair of panels.

The post 258 extends upwardly to a third wall 270. The third wall is positioned at the top of the second wall 224 and has an upper surface that joins the upper surface 246 of the second wall 224. The third wall extends inward from the second wall 224 distally toward the area of the cage. The third wall defines upper surfaces for the cavities 248, 250. The third wall extends distally at least as far as the front wall 264 of the post 258, in the present example. The upper surfaces limit the axial float of the respective tabs 118 and 122 of the nut when the nut is in place in the cage. The height of the bottom of the third wall is greater than the height of the respective openings 234 and 236, so that the vertical float of the tabs 118 and 122 and the adjacent portion of the nut is greater than the vertical float of the tabs 116 and 120 and the adjacent portion of the nut, for example as illustrated in FIG. 11.

Figure 7:
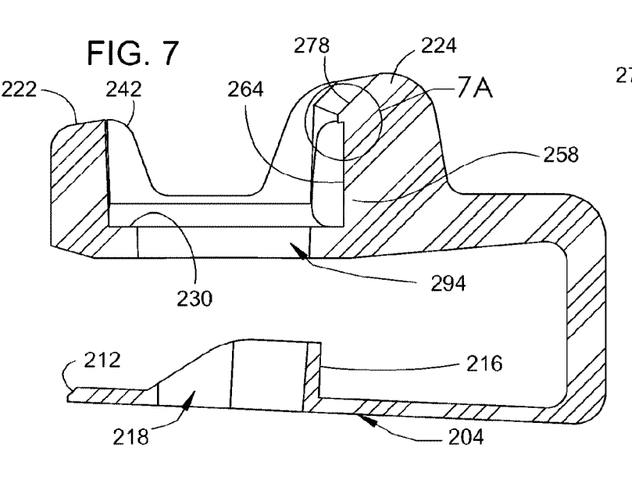
FIG. 7 is a partial sagittal section of the clip of FIG. 5 taken along line 7-7.
Figure 7A:
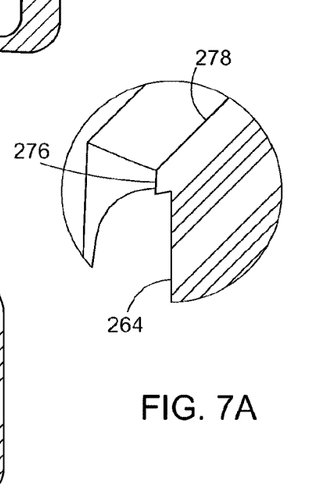
FIG. 7A is an enlarged detail of FIG. 7

In the present example, a substantial portion and as illustrated all of the width of the third wall extends beyond the front face 264 of the post 258 into the area of the cage. The extension of the third wall beyond the front surface of the post forms a ledge or lip 276 in the area of the post 258, and forming an angle with the front face 264 of the post (see FIG. 7A). In the present example, the angle of the lip to the front surface 264 is less than 90°. The length of the lip beyond the post 258 may be selected as a function of the desired force necessary to move the tabs 118 and 122 past the lip and into the cavities 248 and 250, and the desired limitation on the nut for vertical float and difficulty desired for removal of the nut from the cage. The length of the lip may also be selected in part based on the strength, hardness and ductility of the material. The additional length of the third wall provides additional surface areas for the upper surfaces of the cavities 248 and 250 to limit the vertical float of the nut. The upper surfaces of the cavities 248 and 250 also help to limit push out of the nut when a user is trying to thread a male fastener into the nut, and has pressed the fastener against the nut and therefore the nut presses against the upper surfaces of the cavities. The configuration of the third wall is chosen so as to minimize the possibility of push out of the nut until the fastener has been successfully threaded into the nut.

The third wall includes an upper surface 278 extending distally and downwardly toward the bottom of the cage. In the present example, the upper surface 278 is straight and angled downwardly. As illustrated, the angle of a plane 280 parallel to the upper surface 278 (FIG. 6) intersecting the base 230 of the cage is approximately 30-45°. Other angles are possible, or the upper surface 278 can be other than flat. The angled surface helps to guide the adjacent tabs 118 and 122 into their respective cavities as the combination is being assembled.

The lip 276 on the third wall extends into the area of the cage in a direction closer to the second wall. The spacing between the lip and an upper portion of the second wall defines an opening into the cage from above (as viewed in FIG. 1). The spacing is selected so as to limit the axial upward float of the nut in cage, while still allowing a first pair of tabs on the nut to be positioned in the openings 234 and 236 in the first wall, and also allowing a second pair of tabs on the nut to slide down and bear against the upper surface 278 of the third wall, while the first and second walls move outwardly relative to each other. The first and second walls move outwardly relative to each other by flexing of one or both of the first and second walls and/or flexing of the first arm in the area of the cage. When the nut is in place in the cage with the tabs in their respective cavities, the walls and/or first arm return to an un-flexed configuration.

In the present configuration, the second and third walls include reinforcing walls 282 and 284 (FIG. 2). The reinforcing walls 282 and 284 limit the longitudinal and axial flexibility the second and third walls, respectively, providing a measure of flexibility while still properly restraining the nut laterally during normal operating conditions. Each reinforcing wall includes a partially horizontal wall 286 (FIG. 1) and a partially vertical wall 288. The walls 286 and 288 define the other boundaries for their respective openings 254 and 256, created during a molding manufacturing method. Such openings may not be created if another manufacturing method is used, or may have another shape.

First and second sidewalls 290 and 292 extend outwardly from the base 230 of the cage, and extend longitudinally between respective reinforcing walls 242 and 282, and reinforcing walls 244 and 284. Sidewalls 290 and 292 extend outwardly from the base 230 of the cage less than the height of at least one of the first and second walls 222 and 224, and preferably both of the first and second side walls. In the present example, the sidewalls 290 and 292 extend outwardly from the base 230 of the cage less than half the height of the lowest of the first and second walls 222 and 224, in the present example the first wall 222. This allows the first arm 202 to flex slightly in the area between the first and second walls 222 and 224, as the nut is being inserted. Additionally, it is useful to the have the height of the sidewalls 290 and 292 about 20-25% higher than the height of the nut base—when the nut is fully resting on the base 230- to help retaining the nut in the cage. Sidewalls 290 and 292 help to control flexing of the base 230, and therefore possible movement of the first wall relative to the second wall.

The first arm 202 also includes an opening 294 (FIG. 7) extending through the first arm from the lower surface 226 to the base surface 230. The opening 294 is transversely centered in the first arm, and is configured to accommodate a male fastener passing through the opening to the nut 102. The openings 218 and 294 at least partly coincide and are sufficiently aligned to allow a male fastener to extend through the openings and an adjacent opening in a panel for threading into the nut 102. The opening 294 may be circular or oval, and if oval, with the long axis parallel to the longitudinal axis of the first arm.

To assemble the clip and the nut to produce a clip nut assembly, the nut 102 is positioned so that, for example, the first and second tabs 116 and 120 in the first pair of tabs is positioned near or within the respective openings 234 and 236. The tabs 118 and 122 in the second pair of tabs are dropped down or moved against the flat surface 278 of the third wall 270. The nut 102 is then pressed downward toward the base 230 of the cage until the tabs in the second pair of tabs pass the lip 276 and enter the respective cavities 248 and 250 under the third wall 270. As the nut 102 is pressed downward, the spacing between the first and second walls 222 and 224, respectively, increases, for example as the first arm 202 flexes until such time as the tabs 118 and 122 pass the flat surface 278 and enter the cavities 248 and 250, respectively. The nut 102 is then captured in the cage, and the assembly is ready for use. When on a flat surface and level, the nut will typically rest on the base surface 230. The geometries of the respective cavities, base surface, and first, second and third walls will determine the amount of float allowed to the nut. The nut will enter the cage as a function of the amount of flexing that will occur in the base of the first arm, and of the first and second walls relative to each other and any flexing in the third wall when the nut is being pressed into the cage.

The clip nut assembly 100 can then be combined with a mating fastener 300 (FIG. 11), such as a screw, to secure a plurality of panels, for example a first panel 302 to a second panel 304. In one example, the clip nut assembly 100 is slipped over a side edge 306 of the second panel until the clip nut openings 218 and 294 align with a corresponding opening 308 in the second panel 304. The boss 216 (FIGS. 6-7) enters the opening 308 and positions the clip nut assembly properly on the panel 304. The clip nut assembly will generally remain positioned about the opening 308. As the first panel 302 is brought closer to the second arm of the clip nut, and an opening 310 aligned with the opening 308 in the second panel, the mating fastener 300, which may be previously or subsequently inserted into the opening 310, can then be advanced into the opening 208 of the clip.

As the fastener 300 is advanced into the clip nut assembly, the distal tip 312 enters the base of the nut 102, and the user or tool used to insert the fastener advances the fastener until the head 314 is seated against the panel 302, for example at a countersink 316. The user or an automated machine thereby has confirmation that the male fastener can then be threaded into the nut 102.

When the mating fastener 300 is seated against the first panel 302, the the nut 102 has been pressed in the distal direction and floated away from the base surface 230 of the first arm. The first and second tabs on the nut, including the second tab 120 shown in FIG. 11, have been floated to the upper surfaces of the openings 234 and 236, and the first and second tabs 118 and 122 have floated distally to or approaching the upper surfaces of the cavities 248 and 250. Continued advancement of the mating fastener 300 distally against the nut 102 then moves the first arm of the clip distally away from the second panel 304. The first arm 202 of the clip has been pressed sufficiently so that the respective tabs have contacted the upper surfaces of their respective openings or cavities, and the first arm of the clip pushed away from the adjacent surface of the second panel 304. In this configuration, the base of the nut is substantially perpendicular to the axis of the mating fastener 300 due to the relative heights of the openings 234 and 236 and the cavities 248 and 250 when the mating fastener 300 of the selected length has fully seated against the panel 302. When the mating fastener has seated against the panel, the base of the nut 102 is substantially perpendicular to the panel, and the user or machine knows that threading of the mating fastener can begin with the highest probability that the mating fastener can successfully threaded into the nut 102. As threading continues, the nut is pulled proximally toward the base 230 of the first arm, and the first arm ultimately returns into contact with the adjacent surface of the second panel 304 and the nut secured against the base surface 230 of the cage. The panels are thus secured in place.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A non-metal clip having opposed first and second arms extending in a longitudinal direction, movable with respect to each other at respective first end portions of the arms, having first and second openings in the first and second arms substantially aligned and defining an axial direction, and further comprising:
    first and second walls extending from the first arm away from the second arm to respective first and second upper portions and transversely to the longitudinal direction, defining a cage adapted to limit movement of a nut base in the longitudinal direction, wherein at least one of the first and second upper portions includes a third wall extending toward the other of the first and second upper portions, and wherein the third wall is spaced apart from the other upper portion a distance forming an opening sufficient to allow a nut having tabs to be inserted and removed through the opening,
    the first wall having two cavities into which a first pair of tabs may extend and float, the two cavities having upper and lower walls limiting an axial float of the first pair of tabs,
    the second wall having two cavities able to retain axially a second pair of tabs;
    the third wall defining upper surfaces for the cavities limiting axial float of the pair of tabs; and
    wherein the cavities in the first wall have a first height extending away from a base surface of the cage, wherein the cavities in the second wall have a second height extending away from the base surface of the cage, and wherein the first height is less than the second height.

2. The clip of claim 1 wherein the cavities in the first wall are openings extending through the first wall.

3. The clip of claim 2 wherein the cavities in the second wall extend into the second wall a discrete depth in the longitudinal direction.

4. The clip of claim 1 wherein the second wall has a central post located between cavities and the central post in the second wall has at least three sides extending away from a base surface of the cage.

5. The clip of claim 4 wherein the central post in the second wall has at least four sides extending away from the base surface of the cage.

6. The clip of claim 1 wherein the second wall has a central post located between cavities and wherein the central post in the second wall has a rounded surface.

7. The clip of claim 1 wherein the second wall includes an upper surface and the third wall extends transversely from the upper surface in a direction toward the base surface of the cage.

8. The clip of claim 7 wherein the third wall extends at approximately 45° to the base surface of the cage.

9. The clip of claim 7 wherein the second wall has a central post located between cavities and wherein the central post of the second wall faces a central post of the first wall, and wherein the third wall extends in the direction of the central post of the first wall beyond the central post of the second wall.

10. The clip of claim 1 further including a cage bottom and a sidewall extending between the first and second walls and upward from the cage base surface.

11. The clip of claim 10 further including a wall defining an opening through the sidewall.

12. The clip of claim 1 wherein the second wall is positioned between the first wall and an end portion of the first arm, and further including a fourth wall extending upward from the first arm and from the first wall toward the end portion of the first arm.

13. The clip of claim 1 further including a nut having tabs corresponding to respective cavities in the first and second walls.

14. The clip of claim 13 wherein tabs of the nut extend on opposite sides of respective central posts between respective pairs of cavities in the first and second walls.

15. The clip of claim 13 wherein the third wall is configured to limit upward movement of the nut.

16. A non-metal clip comprising opposed first and second arms extending in a longitudinal direction and movable with respect to each other at an end portion of one of the arms, first and second openings in respective ones of the first and second arms wherein the openings coincide and define an axial direction;

first and second walls extending from the first arm away from the second arm and transversely to the longitudinal direction and defining between them a cage having a base surface for supporting a base of a nut and wherein the first and second walls limit longitudinal movement of a nut;

the first wall having a plurality of cavities into which respective tabs of a nut may extend and wherein the plurality of cavities in the first wall includes upper surfaces opposite the base surface of the cage for limiting movement of tabs of a nut away from the base surface of the cage; and the second wall having a plurality of cavities into which respective tabs of a nut may extend and wherein the plurality of cavities in the second wall includes upper surfaces opposite the base surface of the cage and farther from the base surface than upper surfaces in the cavities in the first wall for limiting movement of the tabs of a nut away from the base surface of the cage.

17. A method of assembling a clip nut assembly having a nut with a plurality of tabs and a clip having first and second arms and first and second spaced apart walls extending upward from the first arm and spaced apart from each other longitudinally of the clip, the first wall having a first plurality of cavities and a first central post positioned between adjacent cavities on the first wall, the second wall having a second plurality of cavities and a second central post positioned between adjacent cavities on the second wall, the method including positioning first respective nut tabs in corresponding cavities in the first wall, and positioning second respective nut tabs against an upper surface of the second wall and placing the second respective nut tabs into corresponding cavities in the second wall wherein the second plurality of cavities are configured to allow upward float to a maximum float for the nut tabs greater than the first plurality of cavities.

* * * * *